June 8, 1937.  L. J. ROSE  2,083,094
DISPENSING DEVICE WITH REGULATED MEASURING MEANS
Filed May 9, 1935
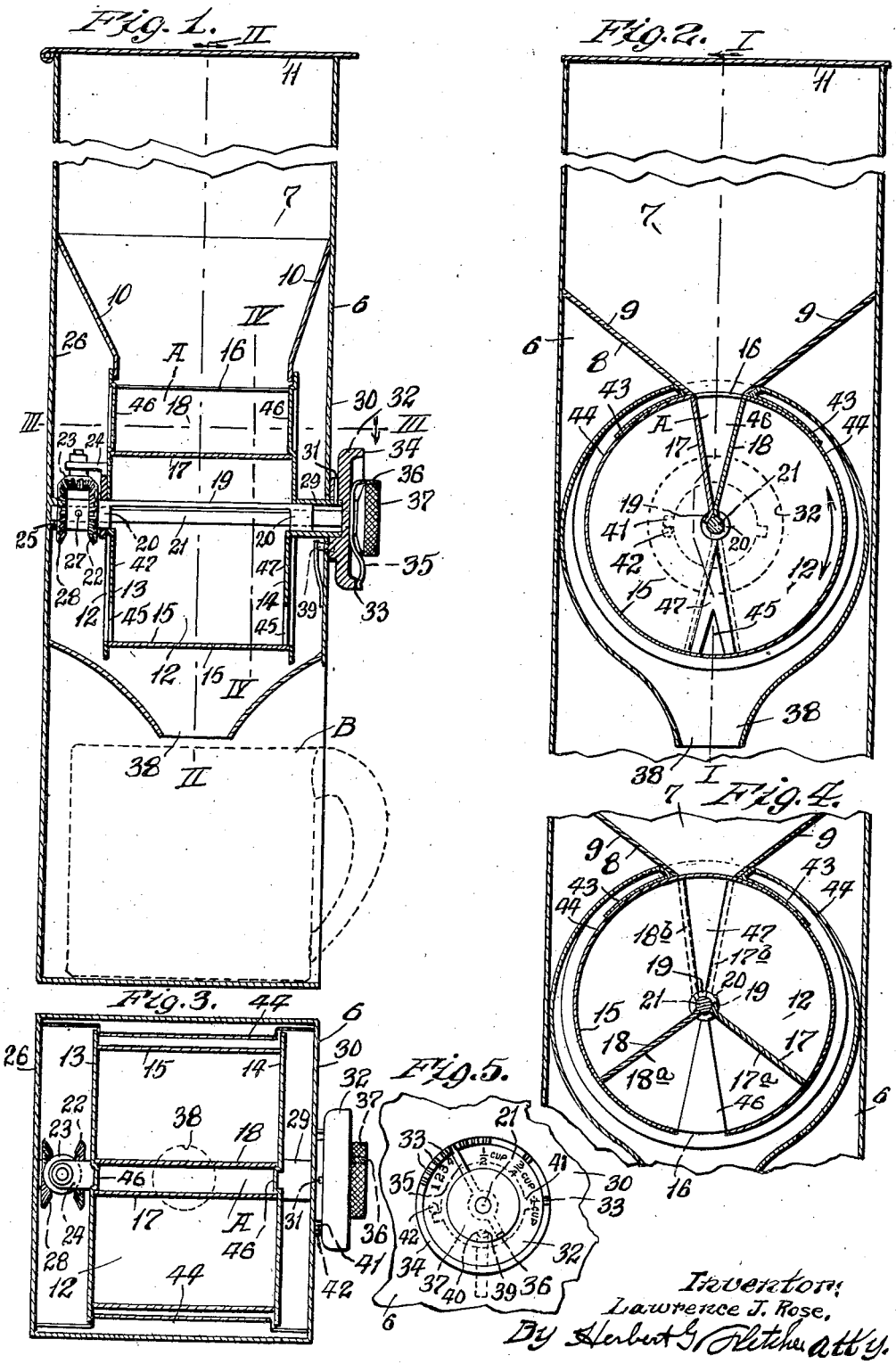
Inventor:
Lawrence J. Rose,
By Herbert G. Fletcher, atty.

Patented June 8, 1937

2,083,094

UNITED STATES PATENT OFFICE 2,083,094

DISPENSING DEVICE WITH REGULATED MEASURING MEANS

Lawrence J. Rose, St. Louis, Mo.

Application May 9, 1935, Serial No. 20,627

12 Claims. (Cl. 221—107)

This invention relates to improvements in a household dispensing device with regulated measuring means for pre-determining desired quantities of baking or cooking ingredients required in assisting the housewife or cook in baking and cooking.

The main object of the invention is to provide a dispensing device with measuring means which can be readily adjusted in a simple manner to standard measurements, such as from tablespoon sizes of discharge, to and including cupful discharges of baking and cooking ingredients, or as may be required.

Another object of the invention is to provide improved means of adjustment for either enlarging or decreasing the combined receiving and delivering receptacle of the device.

A further object of the invention is in providing an improved form for an adjustable receiving and/or discharging receptacle in the device which is cooperable with the improved adjusting means.

Another further object of the invention is in providing an improved locking or retaining means between the regulating measuring means and the dispensing part of the device so that there will be no displacement of one with the other, in respect to the regulating means and the dispensing part of the device.

Other and further objects will appear in the specification and be specifically pointed out in the appended claims, reference being had to the accompanying drawing, exemplifying the invention, and in which:—

Figure 1 is a vertical section through the device taken approximately on the line I—I of Fig. 2, and having an intermediate portion broken away.

Figure 2 is a vertical section taken approximately on the line II—II of Fig. 1.

Figure 3 is a horizontal section taken approximately on the line III—III of Fig. 1.

Figure 4 is a fragmentary vertical section taken approximately on the line IV—IV of Fig. 1, showing a plurality of adjusted positions of the walls of the receiving and discharging measuring receptacle of the device.

Figure 5 is a fragmentary side elevation of a portion of the device.

Referring to the drawing, 6 designates a cabinet having a storing bin 7 with a hopper bottom 8 having opposing pairs of converging walls 9 and 10 disposed to provide a discharge opening at their lower ends. A hinged cover 11 is provided at the top of the storing bin 7.

Disposed in the cabinet 6 in a horizontal position beneath the hopper bottom 8 and in proximity thereto, is a drum 12 having end walls 13 and 14, and a cylindrical periphery 15 having an elongated and longitudinally disposed opening 16 therein of the approximate size and shape of the discharge opening of the hopper bottom 8 in the storing bin 7, and is adapted to communicate with the hopper bottom opening.

Transversely disposed within the drum 12 are a pair of retaining walls 17 and 18, said walls paralleling each other and adapted to be adjusted towards and away from one another for enlarging or decreasing the distance therebetween.

The wall 17 is extended from a tie bar 19 at its lower end, said bar 19 having a bearing 20 at each end in alinement with one another, and supported in said bearings is a shaft 21. One of the bearings 20 is turnably mounted in the end wall 13 of the drum 12 and the other bearing 20 is turnably mounted in the other end wall 14 of said drum, and fixedly secured to the bearing 20 which is mounted in the drum end wall 13, is a bevel gear 22 which is in mesh with a pinion 23 which is supported from a bracket 24, said bracket being fixed to the drum end wall 13. One end of the shaft 21 is mounted in a bearing 25 which is extended from the rear wall 26 of the cabinet 6, and fixedly secured to said shaft by the pin 27 is a bevel gear 28 in mesh with the pinion 23.

The drum end wall 14 is provided with a hub 29 which has bearing engagement with one of the bearings 20 of the tie bar 19 of the wall 17, said hub extending through the front wall 30 of the cabinet 6 and fixed to the extending end of said hub by the pin 31, is a hand turning wheel 32 having graduated notches 33 on the side edge of its rim 34, said notches adapted to be cooperably engaged by an indicating finger 35 which is mounted on the shaft 21, and is secured against turning thereon by being keyed at 36 to a turning button 37 which is fixed to the end of the shaft 21 where said shaft extends through the hand wheel 32.

By engaging and turning the hand wheel 32, the drum 12, walls 17 and 18 and shaft 21, will be turned as a unit by reason of the indicating finger 35 being engaged in a notch 33 of the hand wheel 32. The position of the drum 12 shown in Figs. 1, 2 and 3, indicates the walls 17 and 18 as being spaced a minimum distance apart for forming a pocket or receptacle A therebetween, which is in vertical alinement with the opening 16 in the periphery of the drum and in alinement with the opening of the hopper bottom 8. In this position the pocket A will be filled with a baking ingredient, such as sugar, from the storing bin 7, ready for discharge to the spout 38 when the drum is turned an approximate one-half revolution. The measured quantity may be received from the spout 38, into the utensil B.

It is intended that the pocket A shown, indicates a minimum size, such as for containing one tabelspoonful, although if desired, the walls 17 and 18 can be positioned so that a large pocket can be provided wherein the drum 12 will receive one cupful as a maximum measurement for discharge, or any desired proportional size of receiving pocket can be acquired between measurements from one to sixteen tablespoons, assuming of course that sixteen tablespoons will equal one cup of standard measurement.

For adjusting the walls 17 and 18, the hand wheel 32 is turned so that the drum will be in a position of discharge wherein the opening 16 thereof will be lowermost (Fig. 4) and in this position, a spring actuated pin 39 will engage a recess 40 formed in the back of the hand wheel, then the turning button 37 is engaged for positioning the indicating finger 35 to the desired indicating notch with respect to either spoonful measurements or proportional cup measurements, the pin 39 in the recess 40, preventing turning of the hand wheel 32 with the button 37.

The turning of the button 37 which is fixed to the shaft 21, will turn said shaft and the gear 28 thereon, as well as the wall 18 which is longitudinally secured at its lower end to the shaft, and the gear 28 through the pinion 23, will cause the gear 22 to be turned in the opposite direction, and consequently the wall 17 will be moved therewith by reason of said wall being secured to the tie bar 19 of the bearings 20.

The reason for turning the drum 12 to an inverted position for providing adjustment to the walls 17 and 18 therein, is so that the size of pocket being provided by adjustment, will not be encumbered by a quantity of material therebetween, the periphery 15 of the drum, obviously closing the opening of the hopper bottom 8 of the storing bin.

In Fig. 5 of the drawing, the indicating hand 35 is positioned to indicate a five tablespoon measurement as being required, and with this setting of measurement, a like corresponding position of the walls 17 and 18 is indicated at 17a and 18a in Fig. 4. The walls 17b and 18b shown in dotted lines in Fig. 5, indicate a maximum adjusted position as representing a one cup measurement.

After a desired adjustment of the walls 17 and 18 has been attained, the hand wheel 32 is engaged and turned in a left hand direction for positioning the opening 16 of the drum in vertical alinement with the hopper opening, and which position will be determined by engagement of the lug 41 on the back of the hand wheel 32, abutting with the pin 42 which is extended from the front wheel of the cabinet. A slight turning pressure of the hand wheel will force the spring actuated pin 39 from the recess 40, said pin 39 as afore related, holding the hand wheel from turning while the adjusting button 37 is being manipulated for regulating adjustment of the walls 17 and 18.

For minimizing the escape if any, of the contents between the bottom of the hopper adjacent the opening thereof and the periphery 15 of the drum, a resilient extension 43 having the curvature of the drum periphery and in engagement with the periphery, is located on each side of the hopper opening beneath respective converging walls 9 of the hopper bottom, as shown more clearly in Fig. 2.

The spout 38 is formed from a thin metallic sheet having a pair of upwardly extending and curved branches 44 which are disposed on respective sides of the drum periphery, said branches serving as guards to catch any escape of material that may possibly work out from between the periphery of the drum and the bottom of the hopper.

An opening 45 is formed in each of the end walls 13 and 14 of the drum at points diametrically opposite the opening 16 in the drum periphery. These openings provide for the discharge of material which may escape behind the adjustable walls 17 and 18.

For limiting the adjusting travel of the walls 17 and 18, a pressed-in portion 46 is formed in each of the drum end members 13 and 14 with which the walls 17 and 18 will engage when adjusted to their minimum measuring position, and a pressed-in portion 47 is also formed in each drum end wall, for limiting the movement of said walls 17 and 18, when in their adjusted maximum positions.

Having thus described my invention so that those skilled in the art will be able to practice the same, what I desire to secure by Letters Patent is defined in what is claimed, it being understood that various changes in the device shown and described above in detail and not amounting to invention may be made without departing from the spirit and scope of my invention.

What I claim is:

1. A dispensing device comprising a turnable drum having an opening in its periphery, a pair of walls in the drum disposed to straddle said opening, and means for simultaneously adjusting said walls radially towards or away from said opening.

2. A dispensing device comprising a turnable drum having an opening in its periphery, a pair of walls in the drum disposed to straddle said opening and having sliding contact with the inner surface of the drum periphery, and turnable means carried by the drum for simultaneously adjusting said walls radially towards or away from said opening.

3. A dispensing device comprising a turnable drum having an opening in its periphery, a hopper located above the drum having a discharge opening for communication with the opening of the drum, a pair of walls in the drum disposed to straddle the opening thereof, and means for simultaneously adjusting said walls radially towards or away from the opening of the drum.

4. A dispensing device comprising a turnable drum having an opening in its periphery, a hopper located above the drum having a discharge opening for communication with the opening of the drum, a pair of walls in the drum disposed to straddle the opening thereof, and turnable means carried by the drum for simultaneously adjusting said walls radially towards or away from the opening of the drum.

5. A dispensing device comprising a turnably supported drum having an opening in its periphery, a pair of walls in the drum disposed to straddle said opening, and turnable means having cooperable connection with said walls for simultaneously adjusting said walls towards or away from said opening.

6. A dispensing device comprising a turnably supported drum having an opening in its periphery, a concentric shaft in said drum, a dividing wall in the drum extended from said shaft, a second wall in said drum, said walls adapted to be adjusted towards or away from said opening, and geared means having cooperable connection with said shaft and said second wall and adapted to simultaneously and radially move said walls radially when said shaft is turned.

7. A dispensing device comprising a turnably supported drum having an opening in its periphery, a concentric shaft disposed in said drum, a wall in the drum extended from said shaft, a second wall in said drum, said shaft adapted to be turned for moving the wall which is extended therefrom, and geared means cooperable with said second wall and said shaft for simultaneously causing said walls to be moved radially towards or away from said opening.

8. A dispensing device comprising a turnably supported drum having an opening in its periphery, a concentric shaft disposed in said drum, a wall in the drum extended from said shaft, a second wall in said drum having end bearing engagement therewith, and geared means cooperable with an end bearing of said second wall and said shaft for radially adjusting said walls towards or away from said opening when said shaft is turned.

9. A dispensing device comprising a turnable drum having an opening in its periphery, a hopper located above the drum having a discharge opening for communication with the opening of the drum, a pair of walls in the drum disposed to straddle the opening thereof and adapted to radial adjustment within the drum, turnable means carried by the drum for simultaneously adjusting said walls towards or away from the opening of the drum, and locking means cooperable to prevent the turning of said drum during the adjusting of said walls.

10. A dispensing device comprising a turnable drum having an opening in its periphery, a hopper located above the drum having a discharge opening for communication with the opening of the drum, a discharge spout having upwardly extending portions partially encircling the drum, and an apron formed on each extending portion of the spout and resiliently bearing against the drum periphery on respective sides of the discharge opening of said hopper.

11. A dispensing device comprising a turnable drum having an opening in its periphery, a hopper located above the drum having a discharge opening for communication with the opening of the drum, a pair of radially adjustable walls in the drum disposed to straddle the opening thereof, and sidewalls forming part of the drum, each having an aperture therein adjacent the drum periphery at points diametrically opposite the drum periphery opening.

12. A dispensing device comprising a turnably supported drum having an opening in its periphery, a concentric shaft mounted through the drum having a fixed gear on one end, a wall in the drum extended from said shaft, a second wall in said drum having end bearings mounted on said shaft, and a gear fixed to an end bearing of said second wall having cooperable connection with the gear of said shaft for adjusting said walls towards or away from said opening when the shaft is turned.

LAWRENCE J. ROSE.